Aug. 26, 1930. A. H. ECKARDT ET AL Re. 17,782
ELEVATOR FOR GRAIN, ETC
Original Filed March 23, 1929 2 Sheets-Sheet 1
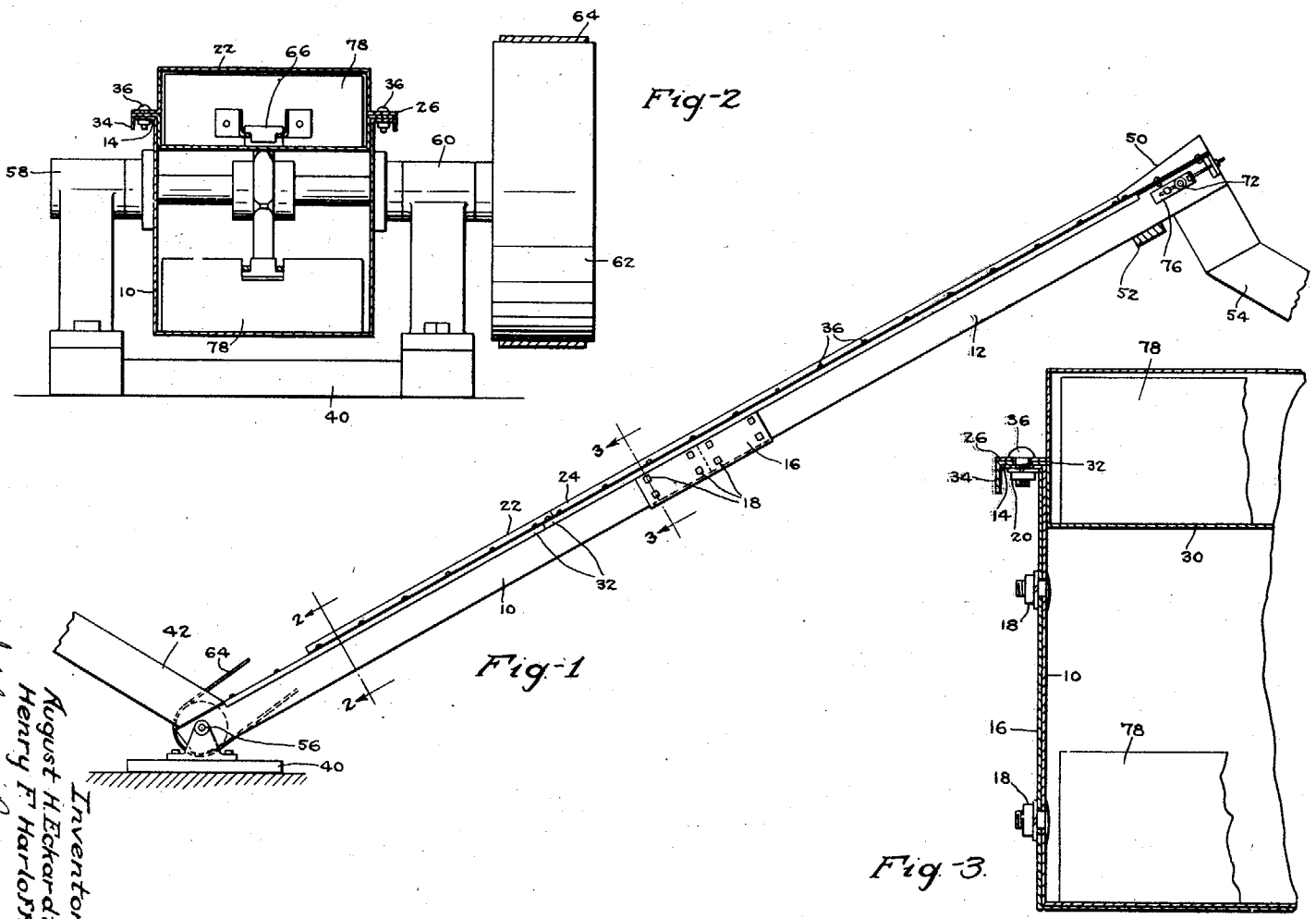
Inventors:
August H. Eckardt
Henry F. Harloff
By Whiteley and Buckman
Attorneys.

Aug. 26, 1930. A. H. ECKARDT ET AL Re. 17,782
ELEVATOR FOR GRAIN, ETC
Original Filed March 23, 1929 2 Sheets-Sheet 2
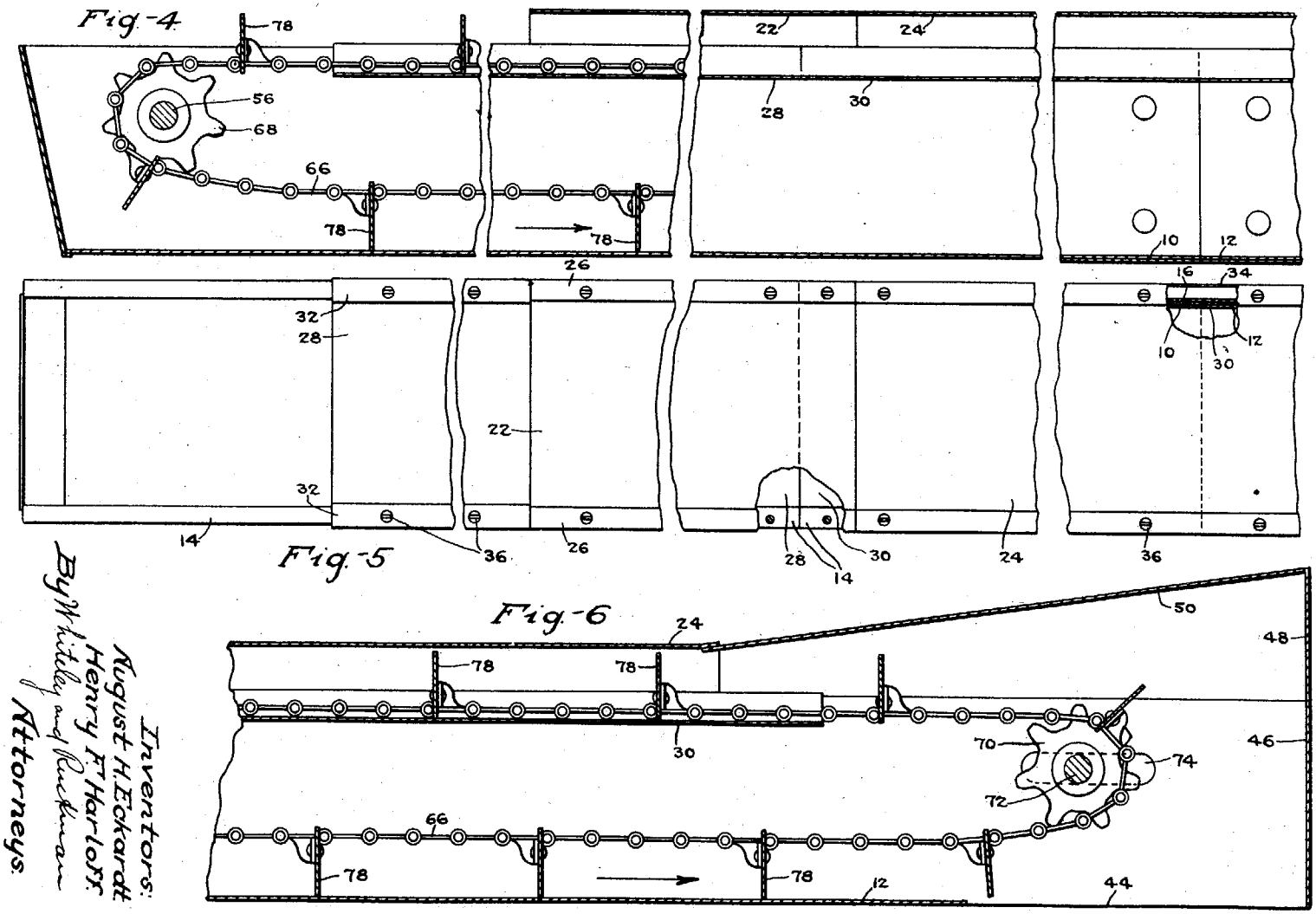
Inventors:
August H. Eckardt
Henry F. Harloff
By Whiteley and Ruckman
Attorneys.

Reissued Aug. 26, 1930 Re. 17,782

UNITED STATES PATENT OFFICE

AUGUST H. ECKARDT AND HENRY F. HARLOFF, OF ST. PAUL, MINNESOTA, ASSIGNORS TO ECKARDT MANUFACTURING COMPANY, OF ST. PAUL, MINNESOTA, A CORPORATION

ELEVATOR FOR GRAIN, ETC.

Original No. 1,747,471, dated February 18, 1930, Serial No. 349,366, filed March 23, 1929. Application for reissue filed May 1, 1930. Serial No. 449,053.

Our invention relates to elevators for grain, etc., and particularly to elevators used for loading purposes. Among the objects of the invention are to provide an apparatus of this character which will be particularly strong and durable and which may be readily set up for use. We accomplish the objects of our invention by providing sets of sheet metal members, the members of each set being secured together in longitudinal alinement by joints which break joints with the joints of the other sets. Each set of members may consist of two or more members according to the length of the apparatus. It is to be understood that while our elevator is intended particularly for handling grain, it may be used for handling other material.

The full objects and advantages of our invention will appear in connection with the detailed description thereof, and the novel features of our inventive idea will be particularly pointed out in the claims.

In the accompanying drawings which illustrate a practical embodiment of our invention,—

Fig. 1 is a side elevational view of the apparatus. Fig. 2 is a view on an enlarged scale in cross section on the line 2—2 of Fig. 1. Fig. 3 is a view on an enlarged scale in cross section on the line 3—3 of Fig. 1. Fig. 4 is a view in longitudinal section of the lower portion of the apparatus. Fig. 5 is a top plan view of the portion shown in Fig. 4. Fig. 6 is a view in longitudinal section of the upper portion of the apparatus.

As shown in the drawings, we provide a lower trough member 10 and an upper trough member 12. These members are made of sheet metal and at their upper sides have outturned flanges 14. The trough members 10 and 12 are butted together in longitudinal alinement and secured by an outside angle plate 16 which fits upon the bottom and sides of the members 10 and 12 at the joint between these two members. The plate 16 is secured in place by bolts 18 and it has outturned flanges 20 which fit underneath the flanges 14. Cover members 22 and 24 of inverted U-shape are provided with outturned flanges 26. Guide members 28 and 30 of U-shape are provided with outturned flanges 32 from which flanges 34 extend downwardly. It will be observed that the joint between the members 10 and 12, the joint between the members 22 and 24, and the joint between the members 28 and 30 are all arranged so that they break joints with each other. The flanges 32 fit upon the flanges 14 while the flanges 26 fit upon the flanges 32. Bolts 36 pass through the flanges 14, 26 and 32 as will be obvious from Fig. 2. By referring to Fig. 3, it will be seen that the bolts 36 also pass through the flanges 20 of the securing plate 16. By referring to Figs. 1, 4 and 5, it will be seen that the guide member 28 extends further down than the cover member 22 so that at the lower end, the bolts 36 pass through the flanges 14 and 32 only. At its lower end, the trough member 10 is provided with an end member 38 and is held by any suitable support such as indicated at 40. A chute 42 is arranged to deliver the material into the lower end of the trough. At its upper end, the trough member 12 is provided with a delivery opening 44 at its bottom and is also provided with an end member 46 which is extended upwardly by means of a plate 48 to which is connected an inclined top member 50 which overlaps with the cover member 24. At its upper end, the trough member 12 is held by any suitable support such as indicated at 52 in Fig. 1. The material discharged through the opening 44 is received in a chute 54 for delivery to any desired place. An endless conveyor is provided for the trough, this conveyor having the construction now to be described. Extending through the lower end of the trough, there is a shaft 56 mounted in bearings 58 and 60 carried by the support 40. A pulley 62 secured to the shaft 56 is driven by a belt 64 which in turn is driven from any suitable source of power. A sprocket chain 66 is trained around a sprocket wheel 68 secured to the shaft 56, this sprocket chain also being trained around a sprocket wheel 70 located near the upper end of the apparatus. The wheel 70 is secured to a shaft 72 passing through slots 74 in the upper end of the trough so that the chain 66 may be adjusted by a take-up device 76 attached to the trough. Attached to the chain 66 at intervals, there are a plurality of flights 78 which on the lower stretch of the chain engage the bottom of the trough and convey the material upwardly. The chain 66 on its upper stretch is supported by the guide members 28 and 30.

The operation and advantages of our invention will be understood in connection with the foregoing description. Not only is an elevator construction provided which is particularly strong and durable, but as will be apparent from Figs. 1, 2 and 3 of the drawings, the walls of the elevator form a complete enclosure lengthwise thereof so that regardless of the position and manner of constructing the interior guide, the grain or other granular material will not be spilled or thrown out as it is being conveyed along the elevator by the flights 78 of the conveyor.

We claim:

1. An elevator for grain comprising a trough having outturned flanges on its upper side, a U-shaped guide having outturned flanges fitting upon said first flanges, means for securing said flanges together, and an endless conveyor in said trough having its upper stretch supported by said guide, said conveyor including flights which engage the bottom of the trough for the lower stretch of the conveyor.

2. An elevator for grain comprising a trough having outturned flanges on its upper side, a U-shaped guide having outturned flanges fitting upon said first flanges, an inverted U-shaped cover having outturned flanges fitting upon said second flanges, means for securing all of said flanges together, and an endless conveyor in said trough having its upper stretch supported by said guide, said conveyor including flights which engage the bottom of the trough for the lower stretch of the conveyor.

3. An elevator for grain comprising a trough consisting of at least two members placed together in longitudinal alinement and having outturned flanges on their upper sides, an outside angle plate fitting over the joint between said members, said angle plate having outturned flanges fitting underneath said first flanges, a U-shaped guide consisting of at least two members placed together in longitudinal alinement and having outturned flanges fitting upon said first flanges, an inverted U-shaped cover consisting of at least two members placed together in longitudinal alinement and having outturned flanges fitting upon said last mentioned flanges, each of said sets of members being placed together in such manner that the joints of each set break joints with the joints of the other sets, and an endless conveyor in said trough having its upper stretch supported by said guide members, said conveyor including flights which engage the bottom of the trough for the lower stretch of the conveyor.

4. An elevator for grain comprising a trough having outturned flanges on its upper side, a guide having its longitudinal edges fitting upon said flanges, means for securing said flanges and edges together respectively, and an endless conveyor adapted to operate in said trough with its upper stretch supported by said guide, said conveyor including flights which engage the bottom of the trough for the lower stretch of the conveyor.

5. An elevator for grain comprising a trough having outturned flanges on its upper side, a guide having its longitudinal edges fitting upon said flanges, an inverted U-shaped cover having outturned flanges fitting upon said longitudinal edges, means for securing said flanges and edges together respectively, and an endless conveyor adapted to operate in said trough with its upper stretch supported by said guide, said conveyor including flights which engage the bottom of the trough for the lower stretch of the conveyor.

6. An elevator for grain comprising a trough consisting of at least two members placed together in longitudinal alinement and having outturned flanges on their upper sides, an outside angle plate secured over the joint between said members, a guide having its longitudinal edges fitting upon said flanges, an inverted U-shaped cover having outturned flanges fitting upon said longitudinal edges, means for securing said flanges and edges together respectively, and an endless conveyor adapted to operate in said trough with its upper stretch supported by said guide, said conveyor including flights which engage the bottom of the trough for the lower stretch of the conveyor.

7. An elevator for grain comprising a trough consisting of at least two members placed together in longitudinal alinement and having outturned flanges on their upper sides, an outside angle plate secured over the joint between said members, a guide having its longitudinal edges fitting upon said flanges, an inverted U-shaped cover consisting of at least two members placed together in longitudinal alinement and having outturned flanges fitting upon said longitudinal edges, means for securing said flanges and edges together respectively, each of said sets of members being placed together in such manner that the joints of each set break joints with the joints of the other set, and an endless conveyor in said trough having its upper stretch supported by said guide, said conveyor including flights which engage the bottom of the trough for the lower stretch of the conveyor.

In testimony whereof, we hereunto affix our signatures.

AUGUST H. ECKARDT.
HENRY F. HARLOFF.